United States Patent
Matsumoto et al.

(10) Patent No.: US 10,534,075 B2
(45) Date of Patent: Jan. 14, 2020

(54) THREE-DIMENSIONAL SURVEYING INSTRUMENT AND THREE-DIMENSIONAL SURVEYING METHOD

(71) Applicant: TOPCON Corporation, Tokyo-to (JP)

(72) Inventors: Hideyuki Matsumoto, Tokyo-to (JP); Yasushi Tanaka, Tokyo-to (JP); Shoji Hayashi, Tokyo-to (JP); Takaaki Saito, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 926 days.

(21) Appl. No.: 15/097,745

(22) Filed: Apr. 13, 2016

(65) Prior Publication Data
US 2016/0320473 A1 Nov. 3, 2016

(30) Foreign Application Priority Data
Apr. 30, 2015 (JP) ................................. 2015-092816

(51) Int. Cl.
*G01C 3/08* (2006.01)
*G01S 7/497* (2006.01)
(Continued)

(52) U.S. Cl.
CPC .............. *G01S 7/497* (2013.01); *G01S 17/42* (2013.01); *G01S 7/4817* (2013.01)

(58) Field of Classification Search
CPC ........ G01S 7/497; G01S 17/42; G01S 7/4817; G01C 3/02; G01C 15/002
See application file for complete search history.

(56) References Cited

U.S. PATENT DOCUMENTS

2006/0245717 A1 11/2006 Ossig et al.
2009/0024342 A1 1/2009 Hertzman et al.
(Continued)

FOREIGN PATENT DOCUMENTS

JP  2001-221635 A  8/2001
JP  2007-517204 A  6/2007

OTHER PUBLICATIONS

European communication dated Sep. 26, 2016 in corresponding European patent application No. 16166551.8.

*Primary Examiner* — Samantha K Abraham
(74) *Attorney, Agent, or Firm* — Nields, Lemack & Frame, LLC (57) ABSTRACT

The invention provides a three-dimensional surveying instrument, which comprises a light emitter for emitting a distance measuring light, a light projecting optical unit for irradiating a distance measuring light from the light emitter along a distance measuring optical axis, a light receiving optical unit for receiving a reflection light from an object to be measured, a photodetection element for converting the reflection light as focused at the light receiving optical unit to an electric signal, a scanning unit for scanning a distance measuring light with respect to the object to be measured provided on a frame unit, angle detecting units for detecting an irradiating direction of the distance measuring light as scanned by the scanning unit, a vibration detecting unit for detecting vibration amount of the frame unit, and a control arithmetic unit having a storage unit where a threshold value is stored, wherein the control arithmetic unit controls so that the number of rotations of the scanning unit is gradually increased from low rotation number to the maximum rotation number, stores in the storage unit by associating the number of rotations with vibration amount as detected, compares vibration amount corresponding to the number of rotations as calculated based on measurement conditions (Continued)

with the threshold value, and performs measurement on the object to be measured in a case where it is judged that vibration amount corresponding to the number of rotations as calculated is lower than the threshold value.

8 Claims, 6 Drawing Sheets

(51) Int. Cl.
*G01S 17/42* (2006.01)
*G01S 7/481* (2006.01)

(56) References Cited

U.S. PATENT DOCUMENTS

| | | | |
|---|---|---|---|
| 2009/0119050 A1 | 5/2009 | Hayashi | |
| 2012/0154786 A1* | 6/2012 | Gosch .................... | G01S 7/4817 356/5.01 |
| 2015/0096181 A1* | 4/2015 | Plangger ............... | G01S 7/4817 33/290 |

* cited by examiner

THREE-DIMENSIONAL SURVEYING INSTRUMENT AND THREE-DIMENSIONAL SURVEYING METHOD

BACKGROUND OF THE INVENTION

The present invention relates to a three-dimensional surveying instrument and a three-dimensional surveying method, by which measurement can be made with high accuracy.

Conventionally, a three-dimensional laser scanner has been known as a surveying instrument to acquire a multiple three-dimensional data (3D data) (three-dimensional point cloud data) of an object to be measured within a short time.

The three-dimensional laser scanner is installed on a tripod, and by rotating a scanning unit such as a mirror or the like to deflect a distance measuring light in a measuring direction, an object to be measured is scanned and a three-dimensional data of the object to be measured is acquired.

Depending on a place of installation or on a condition of installation of the three-dimensional laser scanner or a tripod, or depending on a material or the like of the tripod, in a case where the scanning unit is rotated, the three-dimensional laser scanner is resonated and vibration may occur.

In case of a conventional three-dimensional laser scanner, since the means for detecting vibration is not provided, it is not possible to detect whether there is vibration or not at the time of measurement. Further, in a case where vibration occurs, the conventional three-dimensional laser scanner can not suppress an influence of vibration and an error has occurred in a measurement result. Further, a step of post-processing to remove the influence of vibration from the measurement result has been complicated, and also, much time has been required.

SUMMARY OF THE INVENTION

It is an object of the present invention to provide a three-dimensional surveying instrument and a three-dimensional surveying method, by which it is possible to suppress an influence of vibration and to perform a measurement with high accuracy.

To attain the object as described above, a three-dimensional surveying instrument according to the present invention comprises a light emitter for emitting a distance measuring light, a light projecting optical unit for irradiating a distance measuring light from the light emitter along a distance measuring optical axis, a light receiving optical unit for receiving a reflection light from an object to be measured, a photodetection element for converting the reflection light as focused at the light receiving optical unit to an electric signal, a scanning unit for scanning a distance measuring light with respect to the object to be measured provided on a frame unit, angle detecting units for detecting an irradiating direction of the distance measuring light as scanned by the scanning unit, a vibration detecting unit for detecting vibration amount of the frame unit, and a control arithmetic unit having a storage unit where a threshold value is stored, wherein the control arithmetic unit controls so that the number of rotations of the scanning unit is gradually increased from low rotation number to the maximum rotation number, stores in the storage unit by associating the number of rotations with vibration amount as detected, compares vibration amount corresponding to the number of rotations as calculated based on measurement conditions with the threshold value, and performs measurement on the object to be measured in a case where it is judged that vibration amount corresponding to the number of rotations as calculated is lower than the threshold value.

Further, in the three-dimensional surveying instrument according to the present invention, the control arithmetic unit performs measurement by the number of rotations which is different from the number of rotations as calculated in a case where it is judged that the vibration amount corresponding to the number of rotations as calculated is higher than the threshold value.

Further, in the three-dimensional surveying instrument according to the present invention, the control arithmetic unit notifies an alarm to demand change of a condition of installation in a case where it is judged that the vibration amount corresponding to the number of rotations as calculated is higher than the threshold value.

Further, in the three-dimensional surveying instrument according to the present invention, in a case where the vibration detecting unit detects vibration during measurement of the object to be measured, the control arithmetic unit compares the vibration amount as detected with the threshold value, and in a case where it is judged that the vibration amount as detected is lower than the threshold value, the measurement of the object to be measured is continued.

Further, in the three-dimensional surveying instrument according to the present invention, the control arithmetic unit stops rotation of the scanning unit, calculates again the number of rotations of the scanning unit so that the number of rotations will be different from the number of rotations as calculated, in a case where it is judged that vibration amount as detected is higher than the threshold value, and further, it is judged that the vibration amount as detected is continuously occurred, and the measurement value obtained under a condition exceeding the threshold value is deleted, and the measurement is continued, in a case where the vibration amount as detected is occurred temporarily.

Further, a three-dimensional surveying method according to the present invention performs measurement of an object to be measured based on a predetermined measurement condition, wherein the method comprises a step of gradually increasing the number of rotations of a scanning unit provided on a frame unit from low rotation number to the maximum rotation number, a step of associating the number of rotations of the scanning unit with vibration amount of the frame unit at that moment and of storing in a storage unit, a step of calculating the number of rotations of the scanning unit based on the measurement conditions, a step of comparing the vibration amount corresponding to the number of rotations as calculated with a threshold value as set in advance, and a step of performing measurement processing of the object to be measured, in a case where it is judged that the vibration amount corresponding to the number of rotations as calculated is lower than the threshold value, and of calculating again the number of rotations of the scanning unit so that the number of rotations will be different from the number of rotations as calculated, in a case where it is judged that the vibration amount corresponding to the number of rotations as calculated is higher than the threshold value.

Further, the three-dimensional surveying method according to the present invention comprises a step of performing measurement processing of the object to be measured, which compares vibration amount as detected with the threshold value in a case where vibration of the frame unit is detected, and which continues the measurement processing of the object to be measured in a case where it is judged that the vibration amount is lower than the threshold value, and which calculate again the number of rotations of the scanning unit so that the number of rotations will be different from the number of rotations as calculated in a case where it is judged that vibration amount is higher than the threshold value.

Furthermore, a three-dimensional surveying method according to the present invention, the method comprises a step of rotatably irradiating a distance measuring light by rotating a scanning unit and of acquiring point cloud data, a step of setting a threshold value with respect to vibration amount, and a step of changing the number of rotations of the scanning unit in a case where the vibration amount exceeds the threshold value by performing the measurement.

According to the present invention, the three-dimensional surveying instrument comprises a light emitter for emitting a distance measuring light, a light projecting optical unit for irradiating a distance measuring light from the light emitter along a distance measuring optical axis, a light receiving optical unit for receiving a reflection light from an object to be measured, a photodetection element for converting the reflection light as focused at the light receiving optical unit to an electric signal, a scanning unit for scanning a distance measuring light with respect to the object to be measured provided on a frame unit, angle detecting units for detecting an irradiating direction of the distance measuring light as scanned by the scanning unit, a vibration detecting unit for detecting vibration amount of the frame unit, and a control arithmetic unit having a storage unit where a threshold value is stored, wherein the control arithmetic unit controls so that the number of rotations of the scanning unit is gradually increased from low rotation number to the maximum rotation number, stores in the storage unit by associating the number of rotations with vibration amount as detected, compares vibration amount corresponding to the number of rotations as calculated based on measurement conditions with the threshold value, and performs measurement on the object to be measured in a case where it is judged that vibration amount corresponding to the number of rotations as calculated is lower than the threshold value. As a result, regardless of a condition of installation, e.g., the place of installation or the state of installation or the like, it is possible to reliably detect the number of resonance rotations of the scanning unit where resonance occurs at the frame unit.

According to the present invention, in the three-dimensional surveying instrument, the control arithmetic unit performs measurement by the number of rotations which is different from the number of rotations as calculated in a case where it is judged that the vibration amount corresponding to the number of rotations as calculated is higher than the threshold value. As a result, measurement is not performed under such condition that the frame unit is extensively vibrated due to resonance, and it is possible to suppress the influence of vibration caused by resonance with respect to the measurement result, and to perform measurement of an object to be measured with high accuracy.

Further, according to the present invention, in the three-dimensional surveying instrument, the control arithmetic unit notifies an alarm to demand change of a condition of installation in a case where it is judged that the vibration amount corresponding to the number of rotations as calculated is higher than the threshold value. As a result, it is possible to perform measurement of an object to be measured by the number of rotations as calculated due to a change of the condition of installation.

Further, according to the present invention, in the three-dimensional surveying instrument, in a case where the vibration detecting unit detects vibration during measurement of the object to be measured, the control arithmetic unit compares the vibration amount as detected with the threshold value, and in a case where it is judged that the vibration amount as detected is lower than the threshold value, the measurement of the object to be measured is continued. As a result, it is possible to detect vibration as occurred by external factor during the measurement of the object to be measured.

Further, according to the present invention, in the three-dimensional surveying instrument, the control arithmetic unit stops rotation of the scanning unit, calculates again the number of rotations of the scanning unit so that the number of rotations will be different from the number of rotations as calculated, in a case where it is judged that the vibration amount as detected is higher than the threshold value, and further, it is judged that the vibration amount as detected is continuously occurred, and the measurement value obtained under a condition exceeding the threshold value is deleted, and the measurement is continued, in a case where the vibration amount as detected is occurred temporarily. As a result, it is possible to prevent continuation of measurement under such condition that the frame unit is vibrated at a vibration amount which exceeds a threshold value. Thus, the influence of vibration with respect to the measurement result is suppressed and the measurement of the object to be measured can be performed with high accuracy.

Further, according to the present invention, the three-dimensional surveying method performs measurement of an object to be measured based on a predetermined measurement condition, wherein the method comprises a step of gradually increasing the number of rotations of a scanning unit provided on a frame unit from low rotation number to the maximum rotation number, a step of associating the number of rotations of the scanning unit with vibration amount of the frame unit at that moment and of storing in a storage unit, a step of calculating the number of rotations of the scanning unit based on the measurement conditions, a step of comparing the vibration amount corresponding to the number of rotations as calculated with a threshold value as set in advance, and a step of performing measurement processing of the object to be measured, in a case where it is judged that the vibration amount corresponding to the number of rotations as calculated is lower than the threshold value, and of calculating again the number of rotations of the scanning unit so that the number of rotations will be different from the number of rotations as calculated, in a case where it is judged that the vibration amount corresponding to the number of rotations as calculated is higher than the threshold value. As a result, it is possible to prevent that measurement of the object to be measured is performed under such condition that vibration which exceeds the threshold value occurs. Thus, the influence of vibration with respect to the measurement result can be suppressed, and the measurement of the object to be measured can be preformed with high accuracy.

Further, according to the present invention, the three-dimensional surveying method comprises a step of performing measurement processing of the object to be measured, which compares vibration amount as detected with the threshold value in a case where vibration of the frame unit is detected, and which continues the measurement processing of the object to be measured in a case where it is judged that the vibration amount is lower than the threshold value, and which calculate again the number of rotations of the scanning unit so that the number of rotations will be different from the number of rotations as calculated in a case where it is judged that vibration amount is higher than the threshold value. As a result, even in a case where the vibration occurs during measurement processing, it is possible to prevent that measurement of the object to be measured is performed under such condition that vibration which exceeds the threshold value occurs. Thus, the influence of vibration with respect to the measurement result can be suppressed, and the measurement of the object to be measured can be performed with high accuracy.

Furthermore, according to the present invention, the three-dimensional surveying method, the method comprises a step of rotatably irradiating a distance measuring light by rotating a scanning unit and of acquiring point cloud data, a step of setting a threshold value with respect to vibration amount, and a step of changing the number of rotations of the scanning unit in a case where the vibration amount exceeds the threshold value by performing the measurement. As a result, the association of the number of rotations of the scanning unit with the vibration amount is not required. Thus, the processing can be simplified, and a working time can be shortened.

DETAILED DESCRIPTION OF THE PREFERRED EMBODIMENT

A description will be given below on an embodiment of the present invention by referring to the attached drawings.

First, by referring to FIG. 1, a description will be given on a three-dimensional laser scanner, which is an example of a three-dimensional surveying instrument according to the present embodiment.

Figure 1:
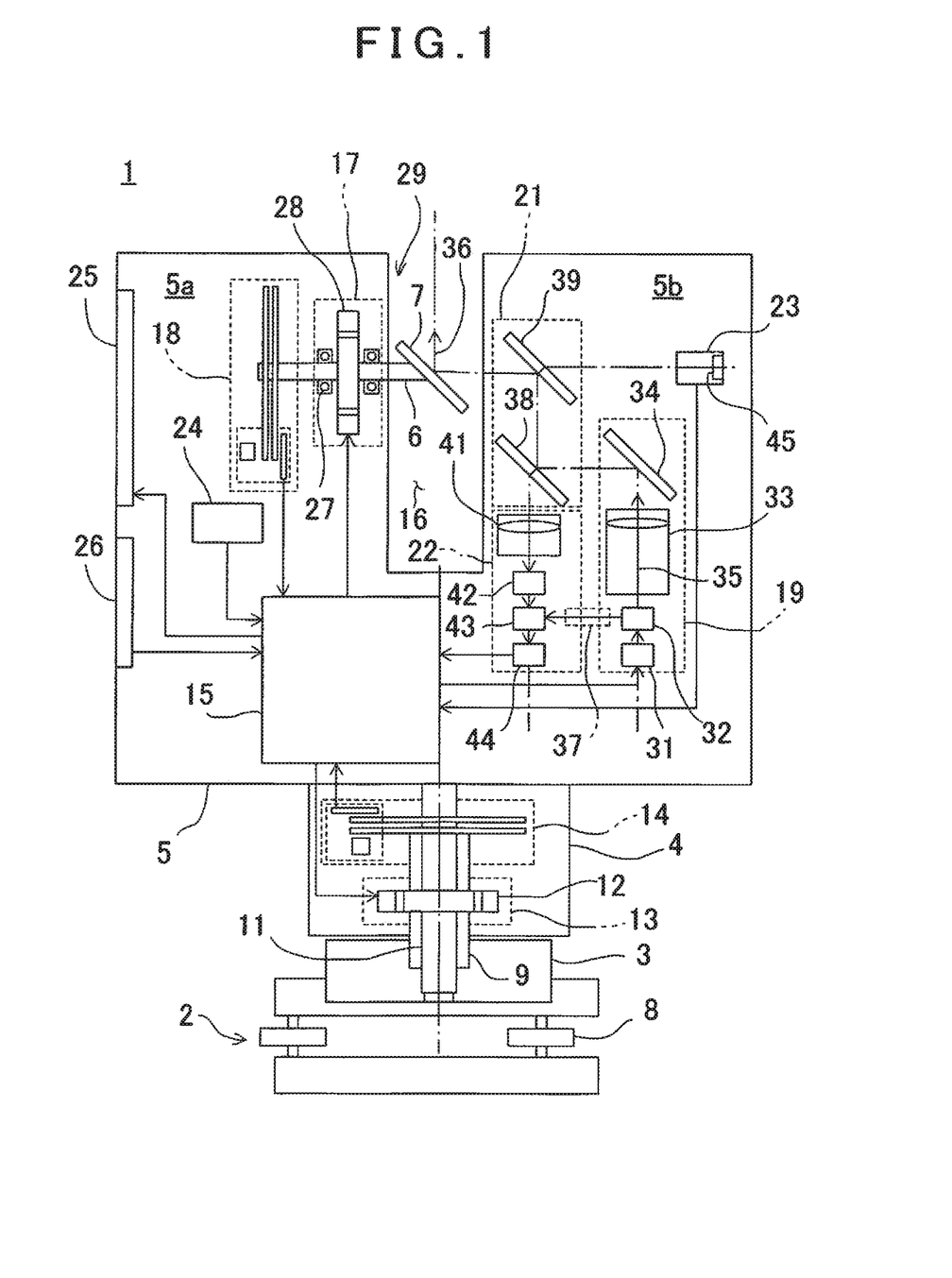
FIG. 1 is a schematic sectional elevational view of a three-dimensional laser scanner, which is an example of a three-dimensional surveying instrument according to an embodiment of the present invention.

As shown in FIG. 1, a three-dimensional laser scanner 1 has a leveling unit 2 as installed on a tripod (not shown), a base unit 3 as installed on the leveling unit 2, a frame unit 5 as provided rotatably in a horizontal direction on the base unit 3 via a horizontal rotary unit 4, and a scanning mirror 7, which is rotatably provided in a vertical direction (in an elevation direction) on the frame unit 5 around a vertical rotation shaft 6 as the center.

The leveling unit 2 has three adjusting screws 8, for instance. A tilt sensor (not shown) as installed on the frame unit 5 adjusts the adjusting screw 8 so as to detect a horizontality, and thus the leveling unit is leveled.

The horizontal rotary unit 4 has a horizontal rotation shaft 11, which is rotatably and vertically supported by the base unit 3 via bearings 9. The frame unit 5 is supported by the horizontal rotation shaft 11 so that the frame unit 5 is rotated integrally with the horizontal rotation shaft 11.

In the horizontal rotary unit 4, a horizontal driving unit 13 including a horizontal drive motor 12 and a horizontal angle detector (e.g. an encoder) 14 for detecting a rotation angle of the horizontal rotation shaft 11 are accommodated. By the horizontal drive motor 12, the frame unit 5 is rotated around the horizontal rotation shaft 11 as the center. It is so arranged that a rotation angle of the horizontal rotation shaft 11 with respect to the base unit 3, i.e. a rotation angle of the frame unit 5 is detected by the horizontal angle detector 14.

Further, a detection result (a horizontal angle) by the horizontal angle detector 14 is inputted to a control arithmetic unit 15 (to be described later) so that a driving of the horizontal drive motor 12 is controlled by the control arithmetic unit 15 based on the detection result.

A recessed portion 16 is formed at the center of the frame unit 5, and rooms 5a and 5b are formed respectively at left and right sides of the recessed portion 16. In one room 5a (a room at left side in the figure), a vertical driving unit 17 and a vertical angle detector 18 are accommodated. In the other room 5b (a room at right side in the figure), a distance measuring light emitting unit 19, a common optical path unit 21, a distance measuring unit 22 and an image pickup unit 23, or the like are accommodated. Further, at the positions as required inside the frame unit 5, the control arithmetic unit 15, an acceleration sensor 24 as a vibration detecting unit, or the like are accommodated. Further, at the portions as required of the frame unit 5, a display unit 25 and an operation unit 26 are installed.

The vertical rotation shaft 6 has an axis, which is extended in a horizontal direction, and it is rotatably supported by the frame unit 5 via bearings 27. One end of the vertical rotation shaft 6 is protruded in the recessed portion 16, and at the end of protruding end of the vertical rotation shaft 6, the scanning mirror 7 is provided in tilted condition at an angle of 45° with respect to axis of the vertical rotation shaft 6. The scanning mirror 7 is supported by the vertical rotation shaft 6 within the recessed portion 16, and the scanning mirror 7 is rotatable in a vertical direction around the vertical rotation shaft 6 as the center.

The vertical driving unit 17 has a vertical drive motor 28 so that the vertical rotation shaft 6 is rotated by the vertical drive motor 28. By the vertical drive motor 28, the scanning mirror 7 is rotated via the vertical rotation shaft 6. It is to be noted that by the vertical rotation shaft 6, the scanning mirror 7, the vertical drive motor 28, or the like, a scanning unit 29 is comprised.

On the vertical rotation shaft 6, the vertical angle detector 18, e.g. an incremental encoder, is provided. By the vertical angle detector 18, rotation angle of the vertical rotation shaft 6 with respect to the frame unit 5 is detected. Detection result (vertical angle) of the vertical angle detector 18 is inputted to the control arithmetic unit 15 so that based on the detection result, driving of the vertical drive motor 28 is controlled by the control arithmetic unit 15.

Further, it is so arranged that the acceleration sensor 24 can detect vibration amount (amplitude) of three axes direction, i.e. X-axis direction, Y-axis direction and Z-axis direction as occurred in the frame unit 5. It is so arranged that detection result of the acceleration sensor 24 is to be inputted to the control arithmetic unit 15.

The distance measuring light emitting unit 19 has a distance measuring light emitter 31, an optical path splitting member 32 such as half mirror, beam splitter, or the like, a light projecting optical unit 33 having an objective lens or the like, and a mirror 34. The distance measuring light emitter 31 is a semiconductor laser or the like, for instance, and emits a pulsed laser beam of infrared light, which is an invisible light, along a distance measuring optical axis 36 as a distance measuring light 35. Further, it is so arranged that the distance measuring light emitter 31 is controlled by the control arithmetic unit 15 so that a pulsed light is emitted in the conditions as required such as a light intensity as required, a pulse interval as required, or the like.

The common optical path unit 21 has a first beam splitter 38 and a second beam splitter 39. Further, the distance measuring unit 22 has a light receiving optical unit 41 having a focus lens or the like, an optical path extension part 42, an optical path coupler 43, and a photodetection element 44.

A part of the distance measuring light 35 as outputted from the distance measuring light emitter 31 passes through the optical path splitting member 32 and enters into the mirror 34 via the light projecting optical unit 33. The distance measuring light 35 is reflected by the mirror 34 and guided to the common optical path unit 21. Further, a remains of the distance measuring light 35 is reflected by the optical path splitting member 32 as an internal reference light and is guided to an internal reference optical path 37.

The distance measuring light 35 as reflected by the mirror 34 is sequentially reflected by the first beam splitter 38 and the second beam splitter 39. Further after being reflected by the second beam splitter 39, the distance measuring light 35 is guided to the scanning mirror 7. It is to be noted that after passing through the first beam splitter 38 and the second beam splitter 39, the distance measuring light 35 is absorbed by an antireflective member (not shown).

It is to be noted that the scanning mirror 7 is a deflecting optical member, and the scanning mirror 7 reflects the distance measuring light 35 entering from a horizontal direction at right angle. Further, it is so arranged that the scanning mirror 7 reflects a reflected distance measuring light as entered in a horizontal direction toward the second beam splitter 39.

The distance measuring light 35 as guided to the scanning mirror 7 from the common optical path unit 21 is reflected by the scanning mirror 7 and is irradiated to an object to be measured (not shown). Further, the scanning mirror 7 is rotated around the vertical rotation shaft 6 as the center so that the distance measuring light 35 is projected in rotary irradiation within a vertical plane. Further, the horizontal rotary unit 4 rotates the frame unit 5 in a horizontal direction so that the distance measuring light 35 is projected in rotary irradiation in a horizontal direction around the horizontal rotation shaft 11 as the center. Therefore, by cooperative operation of the rotation in a vertical direction of the scanning mirror 7 and of the rotation in a horizontal direction of the frame unit 5, a total area of a measurement range can be scanned by the distance measuring light 35.

The reflected distance measuring light as reflected by the object to be measured, which is present within the measurement range, enters into the scanning mirror 7, and is reflected by the scanning mirror 7 and enters into the common optical path unit 21. The reflected distance measuring light is reflected by the second beam splitter 39, and further, the reflected distance measuring light passes through the first beam splitter 38 and is guided to the distance measuring unit 22.

The distance measuring unit 22 guides the reflected distance measuring light as passed through the first beam splitter 38 to the photodetection element 44 and also guides the internal reference light as guided by the internal reference optical path 37 to the photodetection element 44 via the optical path coupler 43.

After passing through the first beam splitter 38, the reflected distance measuring light enters into the light receiving optical unit 41 and is focused by the light receiving optical unit 41 and enters into the optical path extension part 42. After passing through the optical path extension part 42, the reflected distance measuring light is received by the photodetection element 44 via the optical path coupler 43. Further, the internal reference light after passing through the internal reference optical path 37 is received by the photodetection element 44 via the optical path coupler 43.

At the photodetection element 44, the reflected distance measuring light and the internal reference light are converted to a reflected distance measuring light electric signal and an internal reference light electric signal, and the reflected distance measuring light electric signal and the internal reference light electric signal are sent to the control arithmetic unit 15. Based on a difference of time interval between the reflected distance measuring light electric signal and the internal reference light electric signal, a distance from the object to be measured is measured by the control arithmetic unit 15.

The control arithmetic unit 15 calculates coordinate values of the object to be measured based on a distance from the object to be measured as measured, a vertical angle as detected by the vertical angle detector 18, and the horizontal angle as detected by the horizontal angle detector 14. Further, the control arithmetic unit 15 records the coordinate values of the object to be measured for each pulse so that point cloud data relating to the total area of measurement range or relating to the object to be measured can be acquired. By the horizontal angle detector 14 and the vertical angle detector 18, an angle detecting unit for detecting a direction of the distance measuring optical axis 36 is comprised.

An image pickup element 45 is provided on an image pickup optical axis of the image pickup unit 23, and the image pickup element 45 outputs a digital image signal. The image pickup element 45 is composed by an aggregate of pixels, for instance, CCD or CMOS sensor or the like, and the position of each pixel can be specified within the image pickup element 45.

Figure 2:
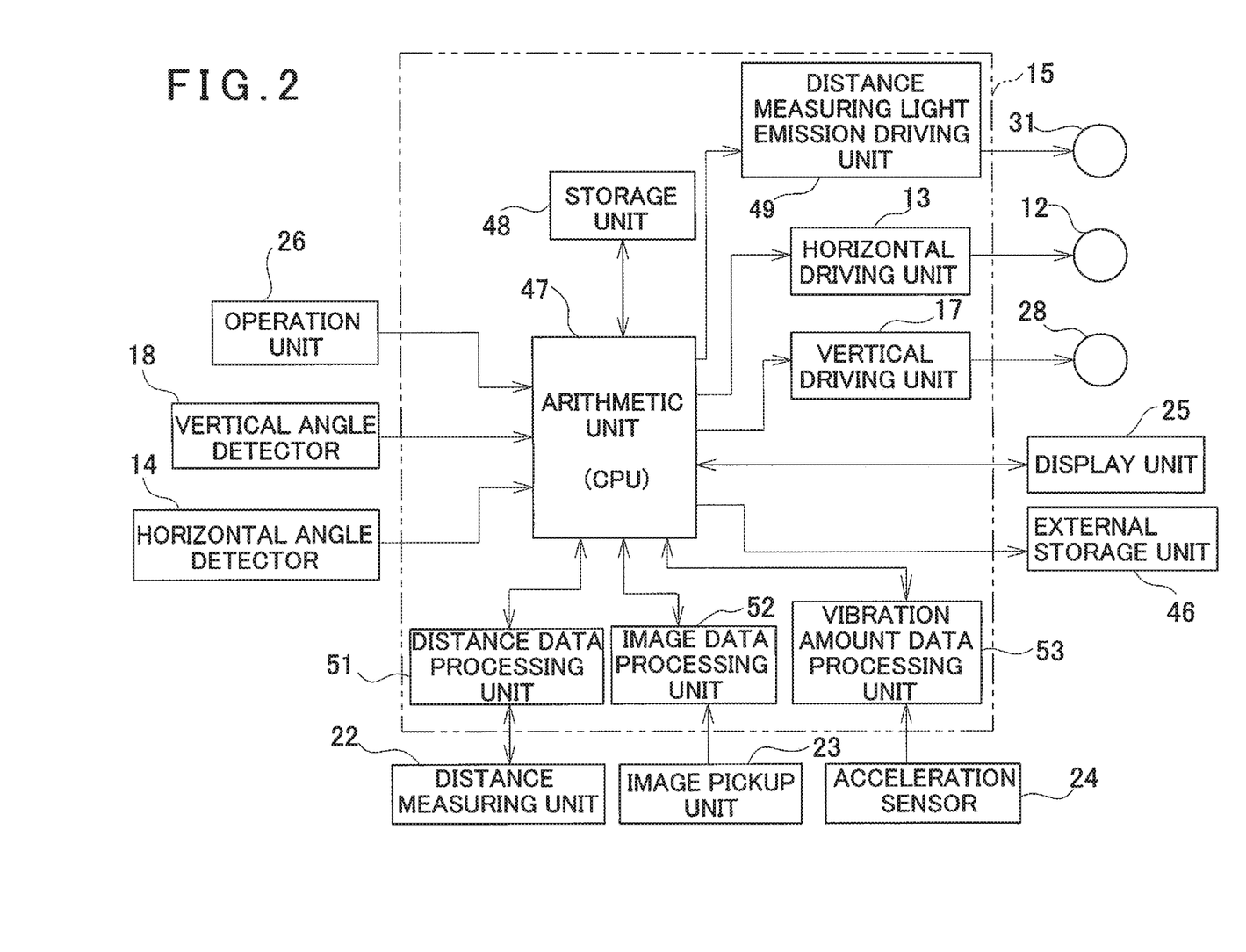
FIG. 2 is a block diagram to show a configuration of the three-dimensional laser scanner.

Next, by referring to FIG. 2, a description will be given on a control system of the three-dimensional laser scanner 1.

The operation unit 26, the vertical angle detector 18, and the horizontal angle detector 14 are electrically connected to the control arithmetic unit 15. Angle detection signals from the vertical angle detector 18 and the horizontal angle detector 14 are inputted to the control arithmetic unit 15, and also signals from the operation unit 26 are inputted by an operation of an operator.

The operator performs a setting of conditions necessary for starting the measurement of the three-dimensional laser scanner 1, e.g., a setting of measurement range, a setting of point cloud data density (pitch), or a setting of image pickup conditions at the time of image pickup, or the like by the operation unit 26. Further, an instruction to start a detection processing of resonance rotation number and a command to start the measurement, or the like, which are described later, can be inputted. It is so arranged that the setting conditions or the like as inputted from the operation unit 26 can be confirmed by the display unit 25. It is to be noted that the operation unit 26 and the display unit 25 may be provided on the frame unit 5 or may be provided independently. In this case, the operation unit 26 and the display unit 25 may be remotely controllable via signal transmitting medium such as wireless, infrared light, or the like.

The control arithmetic unit 15 drives the distance measuring light emitter 31, the horizontal drive motor 12, and the vertical drive motor 28, and also controls the display unit 25, which displays operating conditions and measurement results, or the like. Further, external storage unit 46 such as memory card, HDD, or the like is installed on the control arithmetic unit 15. The external storage unit 46 may be provided to the control arithmetic unit 15 fixedly or detachably.

Next, a description will be given on general features of the control arithmetic unit 15.

The control arithmetic unit 15 has an arithmetic unit 47 represented by CPU, a storage unit 48, a distance measuring light emission driving unit 49 for controlling light emission of the distance measuring light emitter 31, the horizontal driving unit 13 for driving and controlling the horizontal drive motor 12, and the vertical driving unit 17 for driving and controlling the vertical drive motor 28. Further, the control arithmetic unit 15 has a distance data processing unit 51 for processing distance data acquired by the distance measuring unit 22, an image data processing unit 52 for processing image data acquired by the image pickup unit 23, and a vibration amount data processing unit 53 to associate vibration amount data acquired by the acceleration sensor 24 with the number of rotations of the scanning unit 29, or the like.

In the storage unit 48, a sequence program for performing a distance measurement, a measurement of vertical angle, and a measurement of horizontal angle, a calculation program for performing a calculation of the distance measurement or the like, a measurement data processing program for performing a processing of a measurement data, an image pickup program for controlling an image pickup condition of the image pickup unit 23, and image processing program for performing an image processing, an associating program for associating a vibration amount as detected by the acceleration sensor 24 with the number of rotations of the scanning unit 29, a judgement program for judging as to whether the vibration amount as detected exceeds a threshold value, a notification program for notifying the result of judgement, an image display program for displaying a data on the display unit 25, or the like, or the program for integrally managing these programs are stored.

Further, the storage unit 48 stores the data such as measurement data, image data, vibration amount data, or the like, and also stores the threshold value of the vibration amount as set up in advance.

It is to be noted that functions of the distance data processing unit 51, the image data processing unit 52, and the vibration amount data processing unit 53 may be performed by the arithmetic unit 47. In this case, the distance data processing unit 51, the image data processing unit 52, and the vibration amount data processing unit 53 can be omitted.

Further, the distance data processing unit 51, the image data processing unit 52, and the vibration amount data processing unit 53 may be provided separately. For instance, it may be so arranged that a personal computer (PC) may be provided separately so that the PC can perform the functions as the distance data processing unit 51, the image data processing unit 52 and the vibration amount data processing unit 53. In this case, it may be so arranged that communication means are provided on the three-dimensional laser scanner 1 and the PC so that distance data, image data and vibration amount data are transmitted to the PC, and the distance data processing, image data processing, and vibration amount data processing may be performed by PC. It is to be noted that as communication means, communication means as required such as optical communication, wireless communication, LAN, or the like can be adopted.

For the purpose of measuring an object to be measured with high accuracy by the three-dimensional laser scanner 1, it is desirable that the measurement should not be performed under such condition that extensive vibration, e.g., resonance occurs on the frame unit 5 so that the influence of resonance with respect to the measurement results is suppressed.

Figure 3A:
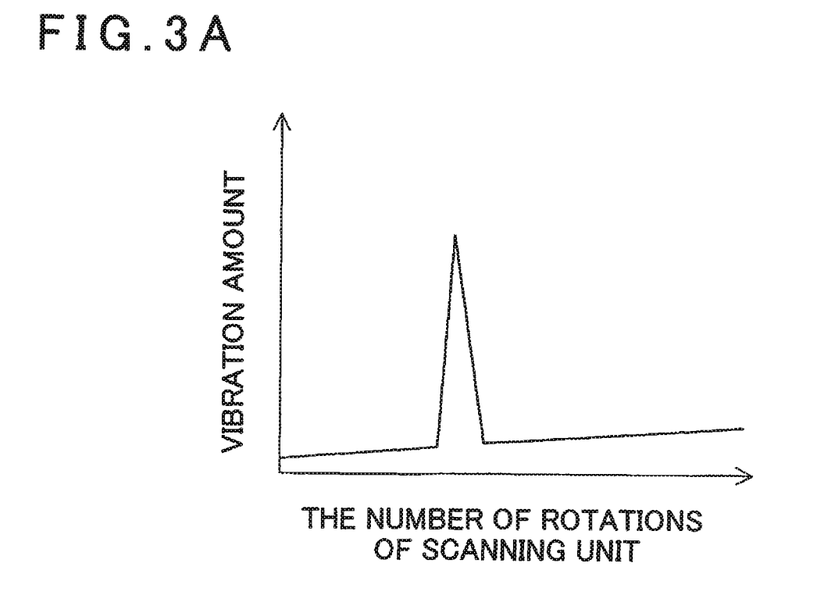
FIG. 3A and FIG. 3B are graphs to explain the number of resonance rotations, which are different due to a difference of a condition of installation.
Figure 3B:
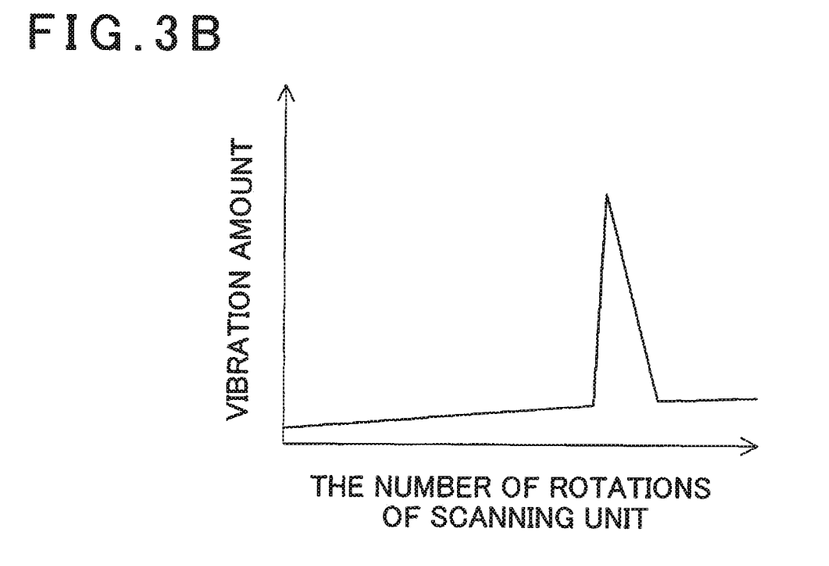

In the three-dimensional laser scanner 1, depending on the conditions of installation such as condition of ground surface for installation of the tripod or the three-dimensional laser scanner 1, material of the tripod, level of extension of legs of the tripod, or the like, in a case where the scanning unit 29 is rotated, the frame unit 5 resonates, and the number of rotations (the number of resonance rotations) which increases the vibration amount rapidly are different (See FIG. 3A and FIG. 3B). Therefore, after the three-dimensional laser scanner 1 is installed, it is necessary to detect the number of rotations of the scanning unit 29 which occurs resonance on the frame unit 5.

In the present embodiment, as preliminary process to perform measurement on the object to be measured, the scanning unit 29 is rotated by changing the number of rotations from low rotation number to maximum rotation number. In this case, the number of rotations where vibration amount which exceeds the threshold value as set up in advance occurs is detected as the number of resonance rotations, and the measurement is not performed at the number of resonance rotations. It is to be noted that in the present embodiment, it is understood that low rotation number includes the condition where the scanning unit 29 is not rotated.

Figure 4:
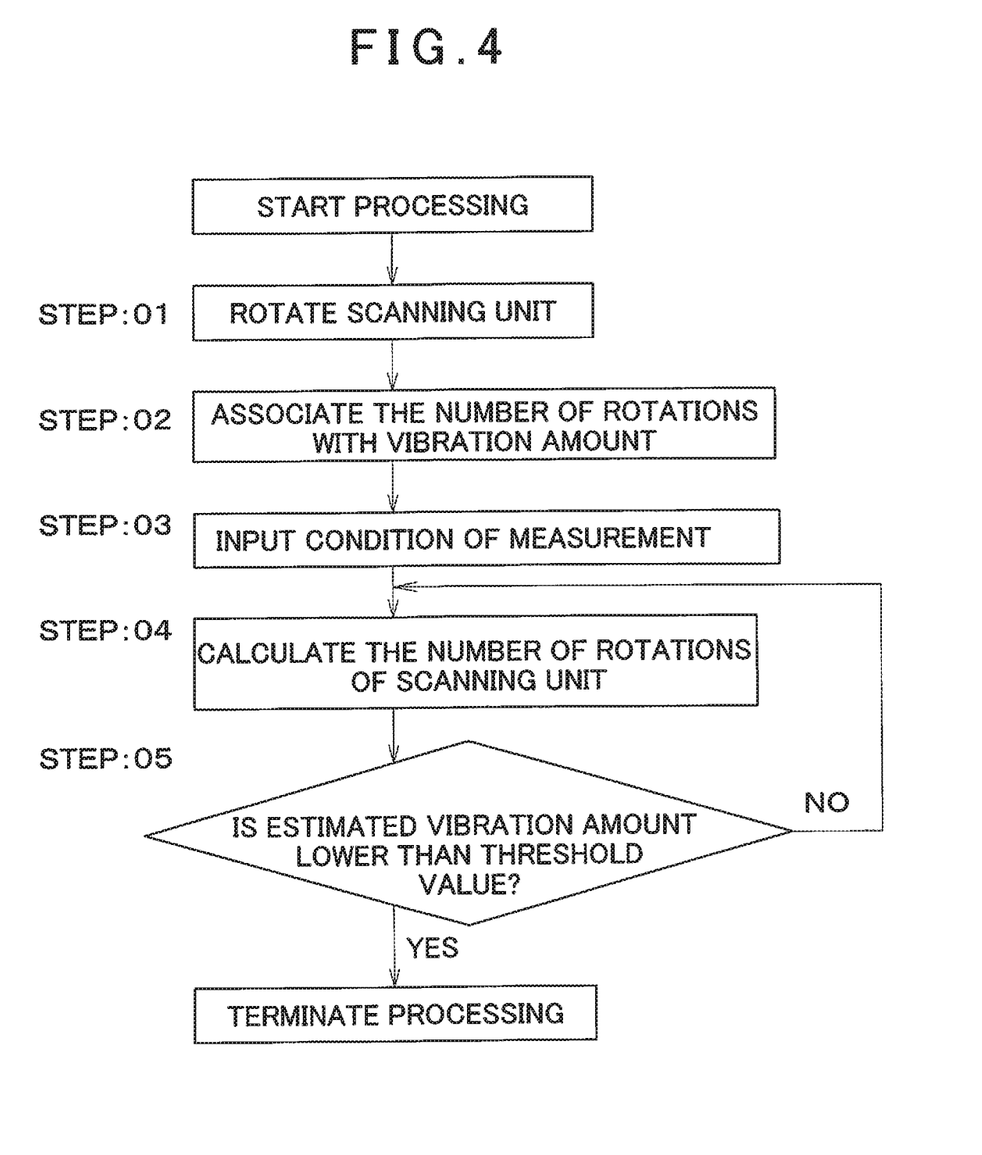
FIG. 4 is a flowchart to explain detection processing of resonance rotation number according to an embodiment of the present invention.

By using a flowchart as shown in FIG. 4, a description will be given below on a detection processing of resonance rotation number of the scanning unit 29 for detecting the number of resonance rotations.

(Step 01) First, the control arithmetic unit 15 makes the vertical driving unit 17 drive the vertical drive motor 28. For instance, the control arithmetic unit 15 gradually increases the number of rotations of the scanning unit 29 within around 10 seconds or so on from 0 rpm to the maximum rotation number of the three-dimensional laser scanner 1 (the scanning unit 29), e.g., up to 2000 rpm at a constant increasing ratio.

(Step 02) During the rotation of the scanning unit 29, vibration amount as occurred on the frame unit 5 is always detected by the acceleration sensor 24. The vibration amount data processing unit 53 performs sampling on the vibration amount as detected by the acceleration sensor 24 and the number of rotations of the scanning unit 29 at this moment at a predetermined interval of the number of rotations. Further, the vibration amount data processing unit 53 associates the vibration amount with the number of rotations, and stores the number of rotations of the scanning unit 29 and the estimated vibration amount corresponding to the number of rotations of the scanning unit 29 to the storage unit 48.

Figure 5A:
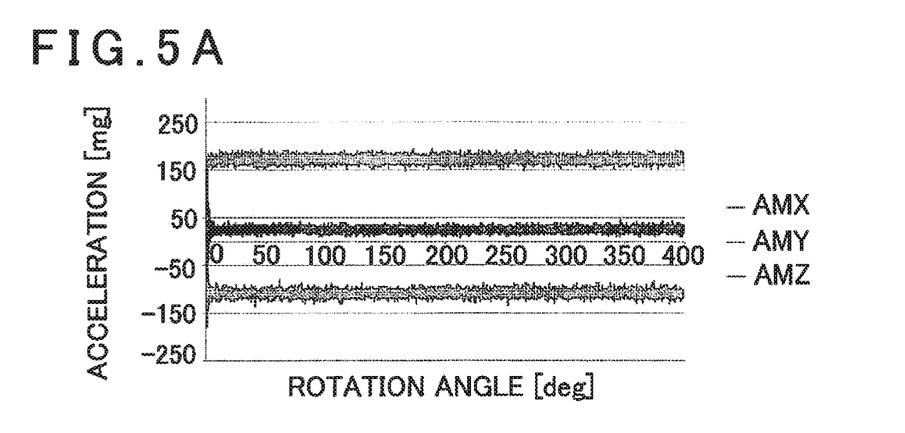
FIG. 5A to FIG. 5C are graphs to show an example of a vibration amount of three axes as detected by the detectin processing of resonance rotation number.
Figure 5B:
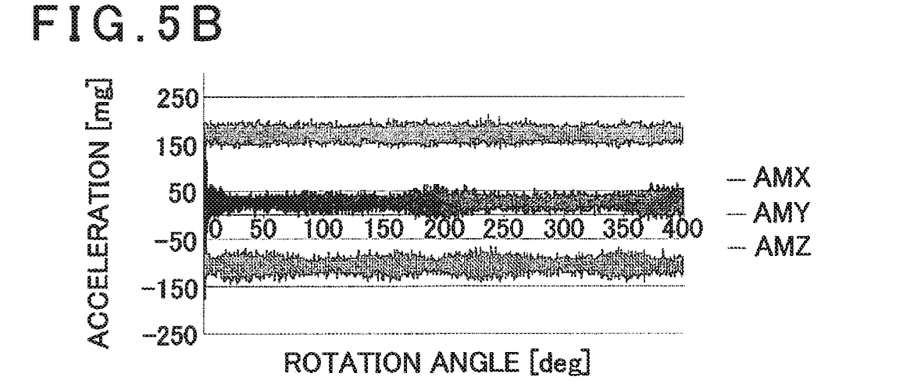
Figure 5C:
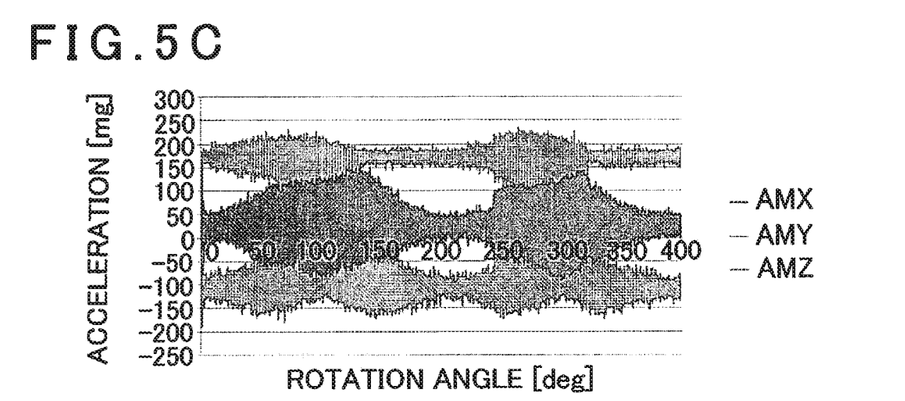

FIG. 5A to FIG. 5C are graphs to show an example of vibration amount in a case where under such condition that the three-dimensional laser scanner 1 is directly placed on a floor, which is not flat, and the frame unit 5 (H-axis) is rotated at 2 rpm, the number of rotations of the scanning unit 29 (V-axis) is changed. It is to be noted that the vibration waveform at upper position shows vibration amount in X-axis direction, the vibration waveform at the middle line shows vibration amount in Y-axis direction, and the vibration waveform at lower position shows vibration amount in Z-axis direction. Further, in FIG. 5A to FIG. 5C, an axis of ordinate shows vibration amount of the frame unit 5 as acceleration, and an axis of abscissa shows rotation angle of the scanning unit 29.

FIG. 5A shows a case where the number of rotations of the scanning unit 29 is set to 600 rpm. Vibration amount when the scanning unit 29 is rotated at 600 rpm is associated with the number of rotations of the scanning unit 29 as estimated vibration amount and is stored in the storage unit 48.

FIG. 5B shows a case where the number of rotations of the scanning unit 29 is set to 1700 rpm. Vibration amount when the scanning unit 29 is rotated at 1700 rpm is associated with the number of rotations of the scanning unit 29 as the estimated vibration amount, and is stored in the storage unit 48.

FIG. 5C shows a case where the number of rotations of the scanning unit 29 is set to 1950 rpm. The vibration amount when the scanning unit 29 is rotated at 1950 rpm is associated with the number of rotations of the scanning unit 29 as the estimated vibration amount, and is stored in the storage unit 48.

It is to be noted that although not shown in the figure, similarly as to the number of rotations other than FIG. A to FIG. C between 0 rpm to 2000 rpm, the vibration amount as detected is associated with the number of rotations of the scanning unit 29, and is stored in the storage unit 48. By performing the process of Step 02, it is judged as to whether there is the number of resonance rotations between 0 rpm to 2000 rpm, and further, in a case where the number of resonance rotations is present, the number of resonance rotations is obtained.

(Step 03) When the association between the number of rotations of the scanning unit 29 from 0 rpm to 2000 rpm and vibration amount as detected by the acceleration sensor 24 has been completed, next, measurement condition of the measurement range and density (pitch) of the point cloud data or the like are inputted by the operation unit 26.

(Step 04) When the measurement condition is inputted by the operation unit 26, the control arithmetic unit 15 calculates the number of rotations of the scanning unit 29, which fulfills the measurement condition as inputted.

(Step 05) The vibration amount data processing unit 53 takes out the estimated vibration amount corresponding to the number of rotations of the scanning unit 29 as calculated from the storage unit 48. Further, the vibration amount data processing unit 53 compares the estimated vibration amount with the threshold value as set up in advance and judges as to whether the estimated vibration amount exceeds the threshold value.

For instance, in a case where the threshold value is set to 100 mg, and in a case where the number of rotations of the scanning unit 29 as calculated is 600 rpm, as shown in FIG. 5A, anyone of vibration amount in X-axis direction, Y-axis direction and Z-axis direction is within the threshold value. Therefore, it is judged that resonance does not occur in the frame unit 5 by the vibration amount data processing unit 53.

Further, in a case where the number of rotations of the scanning unit 29 as calculated is 1700 rpm, as shown in FIG. 5B, although vibration amount in each of X-axis direction, Y-axis direction, and Z-axis direction is slightly increased, anyone of the vibration amount is within the threshold value. Therefore, it is judged that resonance does not occur in the frame unit 5 by the vibration amount data processing unit 53.

Further, in a case where the number of rotations of the scanning unit 29 as calculated is 1950 rpm, as shown in FIG. 5C, in anyone of the cases in X-axis direction, Y-axis direction and Z-axis direction, vibration amount is extensively increased at rotation angle cycle as predetermined and vibration amount exceeding the threshold value is detected. In this case, it is judged that resonance has occurred in the frame unit 5, and it is judged that the number of rotations of the scanning unit 29, i.e. 1950 rpm, is resonance rotations by the vibration amount data processing unit 53.

As described above, in a case where the estimated vibration amount exceeds the threshold value, it is judged that by the vibration amount data processing unit 53, the number of rotations of the scanning unit 29 at this time is the number of resonance rotations. The control arithmetic unit 15 calculates other number of rotations except the number of resonance rotations of the scanning unit 29 as calculated in Step 04, and obtains the estimated vibration amount again. Further, the vibration amount data processing unit 53 compares again the estimated vibration amount with the threshold value, and judges again as to whether the estimated vibration amount exceeds the threshold value.

It is to be noted that in a case where the control arithmetic unit 15 calculates the other number of rotations of the scanning unit 29, it is desirable to calculate so as to decrease the number of rotations of the scanning unit 29 in a case where the number of resonance rotations is close to an upper limit. Further, it is desirable to calculate so as to increase the number of rotations of the scanning unit 29 in a case where the number of resonance rotation is close to a lower limit.

Further, in a case where it is judged that the estimated vibration amount does not exceed the threshold value, it is judged that measurement on the object to be measured can be performed under the measurement condition as inputted, and the detection processing of resonance rotation number is terminated.

It is to be noted that in Step 02, in a case where the vibration amount as detected exceeds the threshold value, the number of rotations of the corresponding scanning unit 29 may be set up as the number of resonance rotations. In this case, in Step 05, it would suffice that the vibration amount data processing unit 53 judges as to whether the number of rotations of the scanning unit 29 as calculated is the number of resonance rotations.

As to whether the vibration amount as detected in Step 02 is caused by the rotation of the scanning unit 29 or suddenly caused by external factor, judgement can be made by a continuous time of vibration and a vibration frequency.

It may also be so arranged that after terminating the detection processing of resonance rotation number, the operator inputs the starting of the measurement by the operation unit 26 again. Further, it is so arranged that after terminating the detection processing of resonance rotation number, measurement is started automatically by the three-dimensional laser scanner 1.

In the measurement processing, the distance measuring light emitter 31 is driven by the distance measuring light emission driving unit 49, and a pulsed laser beam is emitted from the distance measuring light emitter 31 as the distance measuring light 35.

The distance measuring light 35 is turned to a parallel luminous flux by the optical path splitting member 32. Further, after being reflected by the mirror 34, the first beam splitter 38, and the second beam splitter 39, the distance measuring light 35 is deflected at right angle by the scanning mirror 7 and is irradiated toward the object to be measured.

After the reflected distance measuring light as reflected by the object to be measured enters into the scanning mirror 7, is deflected at right angle by the scanning mirror 7, is reflected by the second beam splitter 39 and passes through the first beam splitter 38, the reflected distance measuring light is focused by the light receiving optical unit 41. The reflected distance measuring light as focused by the light receiving optical unit 41 passes through the optical path extension part 42 and enters into the photodetection element 44 via the optical path coupler 43. Further, the distance measuring light 35 (internal reference light) as split by the optical path splitting member 32 is entered into the photodetection element 44 after passing through the optical path coupler 43 via the internal reference optical path 37.

The distance measuring light 35 and the reflected distance measuring light are converted to a distance measuring light electric signal and a reflected distance measuring light electric signal by the photodetection element 44 respectively and are sent to the control arithmetic unit 15. At the control arithmetic unit 15, time interval between the distance measuring light electric signal and the reflected distance measuring light electric signal is measured by the distance data processing unit 51, and a distance from the object to be measured is calculated based on the time interval as measured. The distance from the object to be measured as calculated is stored in the storage unit 48.

Further, in parallel with the distance measurement, an image of the object to be measured is acquired by the image pickup unit 23. A predetermined image processing is performed on the image as acquired by the image data processing unit 52, and the image as processed is stored in the storage unit 48.

It is to be noted that during the measurement processing, vibration may occur on the three-dimensional laser scanner 1 due to external factor such as a case where a tractor passes near the three-dimensional laser scanner 1, or the like. For the purpose of measuring the object to be measured with high accuracy, it is desirable to suppress the influence of sudden vibration as caused by external factor in addition to the resonance as caused by the condition of installation of the three-dimensional laser scanner 1.

Figure 6:
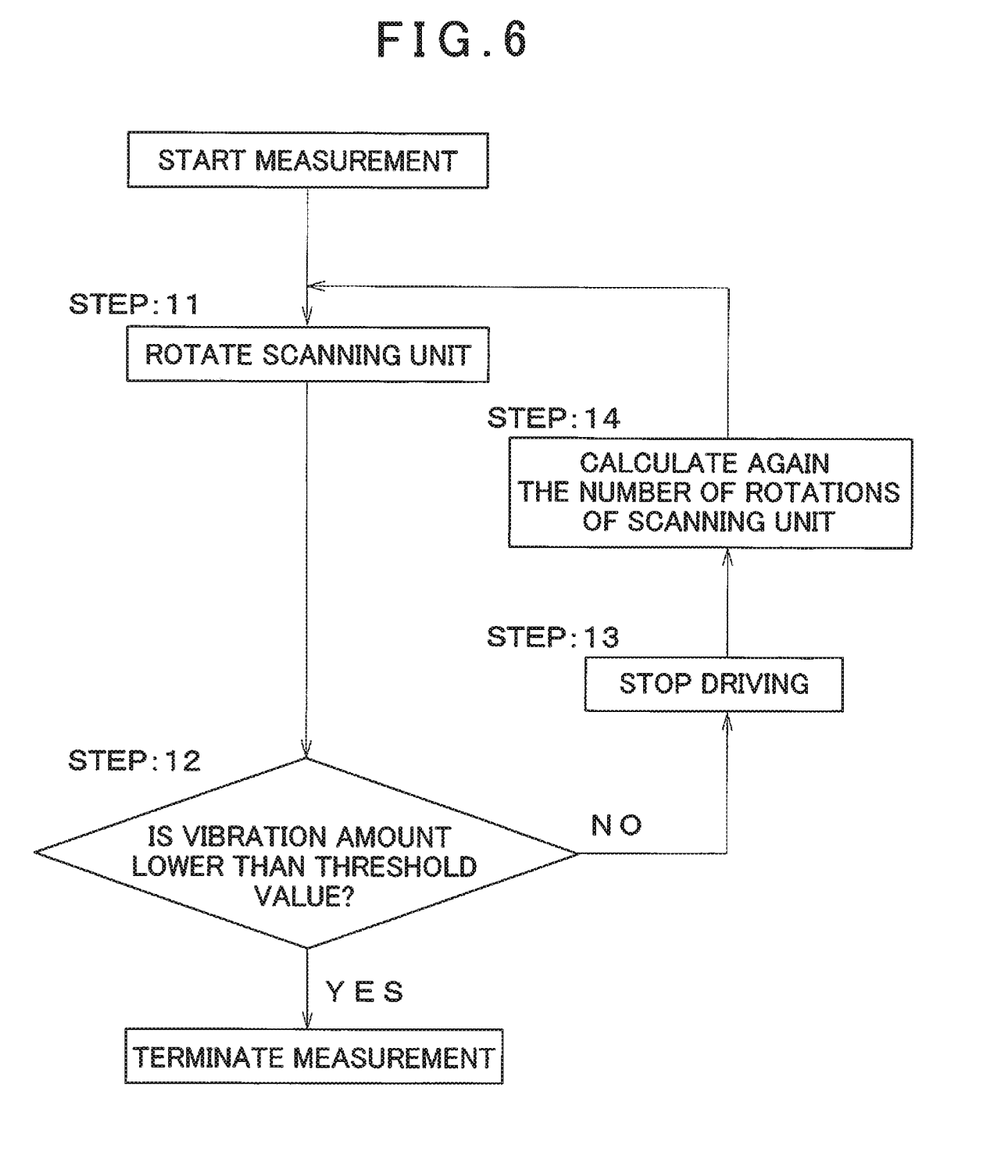
FIG. 6 is a flowchart to explain a suppression processing of external vibration according to an embodiment of the present invention.

By using the flowchart as shown in FIG. 6, a description will be given on the suppression processing of external vibration in a case where vibration occurs on the frame unit 5 during the measurement processing due to external factor.

(Step 11) When the measurement is started, the scanning unit 29 is rotated based on the number of rotations as calculated by the control arithmetic unit 15, and also the frame unit 5 is rotated at a predetermined speed and the measurement is performed.

(Step 12) During the measurement processing, vibration amount as occurred on the frame unit 5 is always detected by the acceleration sensor 24, and vibration amount as detected is always compared by the vibration amount data processing unit 53 whether to exceed the threshold value. In a case where the vibration amount as detected is lower than the threshold value, the measurement processing is continued.

(Step 13) In a case where the vibration amount as detected by the acceleration sensor 24 exceeds the threshold value, the control arithmetic unit 15 stops the horizontal driving unit 13, the vertical driving unit 17, and the distance measuring light driving unit 49.

(Step 14) After stopping the horizontal driving unit 13, the vertical driving unit 17, and the distance measuring light driving unit 49, the control arithmetic unit 15 calculates again the number of rotations of the scanning unit 29, which is different from the number of rotations of the scanning unit 29 in a case where vibration amount which exceeds the threshold value is detected and which also meet the measurement condition as inputted. After the re-calculation of the number of rotations of the scanning unit 29, the control arithmetic unit 15 rotates the scanning unit 29 based on the number of rotations as calculated, and also drives the horizontal driving unit 13, the vertical driving unit 17, and the distance measuring light emission driving unit 49.

It is to be noted that the processings of Step 11 to Step 14 are repeated until the measurement processing by the three-dimensional laser scanner 1 is terminated.

During the measurement processing by the three-dimensional laser scanner 1, suppression processing of external vibration of Step 11 to Step 14 is performed. As a result, it is possible to prevent that the measurement is performed under such condition that vibration occurs on the frame unit 5 due to external factor during the measurement processing. Therefore, the influence of vibration due to external factor with respect to the measurement result can be suppressed, and the measurement of the object to be measured can be performed with high accuracy.

It is to be noted that in Step 12, further it may be so arranged that the vibration amount data processing unit 53 judges as to whether the vibration amount which exceeds the threshold value is detected temporarily. In a case where it is judged that the vibration which exceeds the threshold value occurs temporarily, the measurement value detected when the vibration amount exceeds the threshold value is to be deleted, and the measurement is continued without changing the number of rotations of the scanning unit 29.

As described above, according to the present embodiment, during the measurement processing is performed, by the three-dimensional laser scanner 1, the detection processing of resonance rotation number is performed. As a result, regardless of the condition of installation, e.g., the place of installation or the state of installation, or the like of the three-dimensional laser scanner 1, and the number of resonance rotations can be detected reliably, and it is possible to prevent the rotation of the scanning unit 29 by the number of resonance rotations.

Therefore, the measurement is not performed under such condition that the frame unit 5 is vibrated extensively due to resonance. Thus, the influence of vibration due to resonance with respect to measurement result can be suppressed, and measurement of the object to be measured can be performed with high accuracy.

Further, since the suppression processing of external vibration is performed during the measurement processing by the three-dimensional laser scanner 1. As a result, in a case where vibration occurs in the frame unit 5 due to external factor during the measurement processing, it is possible to prevent from performing the measurement under such condition that the frame unit 5 is vibrated. Therefore, it is possible to suppress the influence of vibration due to external factor with respect to the measurement result, and the measurement of the object to be measured can be performed with high accuracy.

It is to be noted that in the present embodiment, the Step 01 to the Step 05 are described as the detection processing of resonance rotation number before the measurement is performed, while this processing may be performed as the processing to determine whether installation of the three-dimensional laser scanner 1 can be installed or not.

In a case of the processing to determine whether installation can be performed or not, in a case where it is judged that the estimated vibration amount corresponding to the number of rotations of the scanning unit 29 as calculated in Step 04 exceeds the threshold value as set in advance in Step 05, an alarm is notified to demand the change the condition of installation, e.g., the place of installation or the state of installation or the like of the three-dimensional scanner 1 by a display on the display unit 25 or by voice or the like.

Following the notified alarm, by changing the condition of installation of the three-dimensional laser scanner 1 and by performing again the processing to determine whether installation can be performed or not, operator can confirm again that the condition of installation of the three-dimensional laser scanner 1 is appropriate or not.

When the three-dimensional laser scanner 1 is installed, by performing the processing to determine whether installation can be performed or not, for instance, in a case where by the restriction of parts, e.g., the quality of the laser crystal or the like to be used in the distance measuring light emitter 31, measurement should be performed at the number of rotations as calculated by the control arithmetic unit 15 or the like, the measurement can be effectively performed.

Further, it may be so arranged that the condition of measurement is inputted after the installation of the three-dimensional laser scanner 1 and based on the condition of measurement, the scanning unit 29 is rotated at the predetermined number so as to judge whether the vibration amount exceeds the threshold at this time. In a case where the vibration amount exceeds the threshold value, the number of rotations of the scanning unit 29 is changed to the number of rotations as set in advance, and vibration amount at this time is compared with the threshold value.

By processing as described above, it is not necessary to associate between the number of rotations and the vibration amount in Step 02. Thus, it is possible to simplify the processing and shorten the working time.

The invention claimed is:

1. A three-dimensional surveying instrument, comprising a light emitter for emitting a distance measuring light, a light projecting optical unit for irradiating a distance measuring light from said light emitter along a distance measuring optical axis, a light receiving optical unit for receiving a reflection light from an object to be measured, a photodetection element for converting said reflection light as focused at said light receiving optical unit to an electric signal, a scanning unit for scanning a distance measuring light with respect to said object to be measured provided on a frame unit, angle detecting units for detecting an irradiating direction of the distance measuring light as scanned by said scanning unit, a vibration detecting unit for detecting vibration amount of said frame unit, and a control arithmetic unit having a storage unit where a threshold value is stored, wherein said control arithmetic unit controls so that the number of rotations of said scanning unit is gradually increased from low rotation number to the maximum rotation number, stores in said storage unit by associating the number of rotations with vibration amount as detected, compares vibration amount corresponding to the number of rotations as calculated based on measurement conditions with said threshold value, and performs measurement on said object to be measured in a case where it is judged that vibration amount corresponding to said number of rotations as calculated is lower than said threshold value.

2. The three-dimensional surveying instrument according to claim 1, wherein said control arithmetic unit performs measurement by the number of rotations which is different from the number of rotations as calculated in a case where it is judged that said vibration amount corresponding to the number of rotations as calculated is higher than said threshold value.

3. The three-dimensional surveying instrument according to claim 1, wherein said control arithmetic unit notifies an alarm to demand change of a condition of installation in a case where it is judged that said vibration amount corresponding to said number of rotations as calculated is higher than said threshold value.

4. The three-dimensional surveying instrument according to claim 1, wherein, in a case where said vibration detecting unit detects vibration during measurement of said object to be measured, said control arithmetic unit compares the vibration amount as detected with said threshold value, and in a case where it is judged that said vibration amount as detected is lower than said threshold value, the measurement of said object to be measured is continued.

5. The three-dimensional surveying instrument according to claim 4, wherein said control arithmetic unit stops rotation of said scanning unit, calculates again the number of rotations of said scanning unit so that the number of rotations will be different from said number of rotations as calculated, in a case where it is judged that said vibration amount as detected is higher than said threshold value, and further, it is judged that said vibration amount as detected is continuously occurred, and the measurement value obtained under a condition exceeding said threshold value is deleted, and the measurement is continued, in a case where said vibration amount as detected is occurred temporarily.

6. A three-dimensional surveying method for performing measurement of an object to be measured based on a predetermined measurement condition, wherein said method comprises a step of gradually increasing the number of rotations of a scanning unit provided on a frame unit from low rotation number to the maximum rotation number, a step of associating the number of rotations of said scanning unit with vibration amount of said frame unit at that moment and of storing in a storage unit, a step of calculating the number of rotations of said scanning unit based on the measurement conditions, a step of comparing the vibration amount corresponding to the number of rotations as calculated with a threshold value as set in advance, and a step of performing measurement processing of said object to be measured, in a case where it is judged that the vibration amount corresponding to the number of rotations as calculated is lower than said threshold value, and of calculating again the number of rotations of said scanning unit so that the number of rotations will be different from the number of rotations as calculated, in a case where it is judged that the vibration amount corresponding to the number of rotations as calculated is higher than said threshold value.

7. The three-dimensional surveying method according to claim 6, comprising a step of performing measurement processing of said object to be measured, which compares vibration amount as detected with said threshold value in a case where vibration of said frame unit is detected, and which continues the measurement processing of said object to be measured in a case where it is judged that the vibration amount is lower than said threshold value, and which calculate again the number of rotations of said scanning unit so that the number of rotations will be different from the number of rotations as calculated in a case where it is judged that vibration amount is higher than said threshold value.

8. A three-dimensional surveying method, said method comprises a step of rotatably irradiating a distance measuring light by rotating a scanning unit and of acquiring point cloud data based on a reflected distance measuring light as reflected by an object to be measured, a step of rotating said scanning unit a number of rotations as set based on a measurement condition and performing a measurement and a step of changing the number of rotations in a case where a vibration amount of said scanning unit as detected during the measurement exceeds a threshold value as set in advance.

\* \* \* \* \*